United States Patent [19]

Bak et al.

[11] Patent Number: 5,531,974
[45] Date of Patent: Jul. 2, 1996

[54] FLUX GROWN, MONOSIZE OXIDE PARTICLES

[75] Inventors: Chan S. Bak, Newberry Park; Hiroshi Kimura, Northridge; Ricardo C. Pastor, Manhattan Beach, all of Calif.

[73] Assignee: Hughes Aircraft Company, Los Angeles, Calif.

[21] Appl. No.: 210,109

[22] Filed: Mar. 17, 1994

Related U.S. Application Data

[63] Continuation-in-part of Ser. No. 910,591, Jul. 8, 1992, abandoned.

[51] Int. Cl.$^6$ .......................... C01F 17/00; C01G 23/00; C01B 33/26
[52] U.S. Cl. .......................... 423/263; 423/593; 423/598; 423/330.1
[58] Field of Search .......................... 23/295 G; 423/598, 423/263, 330.1, 333, 593, 71; 501/134; 252/301.4 R; 502/8; 117/950, 74, 78

[56] References Cited

U.S. PATENT DOCUMENTS

| | | | |
|---|---|---|---|
| 3,413,083 | 11/1968 | Daendliker | 423/263 |
| 3,637,531 | 1/1972 | Faxon et al. | 423/598 |
| 3,677,718 | 7/1972 | Lawless | 423/598 |
| 3,725,298 | 4/1973 | Woodhead et al. | 423/593 |
| 3,737,520 | 6/1973 | Jacobson | 423/598 |
| 4,041,143 | 8/1977 | Fujiki et al. | 423/598 |
| 4,061,583 | 12/1977 | Murata et al. | 423/598 |
| 4,108,970 | 8/1978 | Ballman et al. | 423/593 |
| 4,762,639 | 8/1988 | Kasenga et al. | 252/301.4 R |
| 4,853,199 | 8/1989 | Inoue et al. | 423/593 |
| 4,957,888 | 9/1990 | Brand et al. | 501/134 |
| 4,965,056 | 10/1990 | Chang | 501/134 |
| 5,037,577 | 8/1991 | Yamanoi et al. | 423/263 |
| 5,076,815 | 12/1991 | Kunz et al. | 501/134 |
| 5,091,348 | 2/1992 | Woodhead et al. | 501/134 |
| 5,112,433 | 5/1992 | Dawson et al. | 523/598 |
| 5,228,910 | 7/1993 | Joyce et al. | 501/106 |

OTHER PUBLICATIONS

Robson, H., "Synthesizing Zeolites", Chemtech, 8(3), Mar., 1978, pp. 178–180.

*Primary Examiner*—Steven Bos
*Attorney, Agent, or Firm*—V. D. Duraiswamy; W. K. Denson-Low

[57] ABSTRACT

The preparation of an amorphous gel of a hydrated oxide is coupled with the technique of controlled seeding to obtain monosize crystallized particles. Crystalline oxide particles, such as phosphors, are formed by a method comprising: (a) selecting an oxide system; (b) forming an amorphous phase of the oxide system; (c) controllably forming nuclei in the amorphous phase; and (d) converting the amorphous phase to the crystalline oxide particles by growth of the nuclei. The oxide particles have a substantially single size, with a narrow size distribution.

16 Claims, 6 Drawing Sheets

FLUX GROWN, MONOSIZE OXIDE PARTICLES

CROSS-REFERENCE TO RELATED APPLICATION

The present application is a continuation-in-part application of Ser. No. 07/910,591, filed Jul. 8, 1992, and now abandoned.

BACKGROUND OF THE INVENTION

1. Field of the Invention

The present invention relates to the preparation of oxides, and, more particularly, to the preparation of crystallized powder of a substantially single size. Although the invention specifically contemplates use of the oxides as phosphors, because particles of uniform size pack more efficiently, the oxides prepared in accordance with the invention may also be used in the fabrication of dense, sintered ceramics, such as ferrite cores (e.g., yttrium iron garnet), transducers (barium titanate), and the like.

2. Description of Related Art

Powders of phosphors are used for display purposes. The typical particle size of the powder ranges from about 2 to 10 µm, depending on the energy of the electron beam, although larger particle sizes may be employed as the energy of the electron beam is increased. The particle size distribution itself is typically about 4 µm.

The more uniform the particle size of a phosphor, that is, where the particle size distribution approaches zero, the better the resolution of the phosphor display. Current approaches to obtaining phosphor particles of a substantially single particle size are based on the control of particle-size distribution of the crystallized powder during the synthesis of a multicomponent system, or compound. Unfortunately, the temperature required for synthesis is above the temperature for particle growth and sintering. Consequently, there is either no control of particle size or no control of particle size distribution, which, at best, is broad.

The next alternative is sizing, such as by sedimentation in a neutral liquid or elutriation in air, to obtain a sharper particle size distribution. However, if a sharper size distribution and/or a smaller peak size is desired, the yield is poor.

When particle size distribution, concomitant with synthesis, cannot be realized, the product is comminuted, usually by ball milling, to obtain a working particle size distribution and may be sold as such without further sizing. This provides an inferior starting material, because of considerable surface damage of the particles, in addition to impurity pickup during grinding.

The amorphous monosize preparation of a one-component oxide system, such as $SiO_2$, has been achieved. However, the process for its conversion to a monosize crystal powder is not obvious. Thus far, such a demonstration has not been achieved. Mere heating to crystallize the monosize amorphous form is plagued by competition from two other processes: (1) transformation into the vitreous state, thereby precluding crystallization, and (2) sintering, which obliterates the monosize condition. The problem is complicated further in a multi-component system where the desired end-product is a compound of definite (fixed) stoichiometry, as in yttrium aluminum garnet ($Y_3Al_5O_{12}$; YAG), yttrium iron garnet ($Y_3Fe_5O_{12}$; YIG), zircon ($ZrSiO_4$), and the like.

Thus, there remains a need to provide a process for the preparation of oxides, whether single component or multicomponent, of substantially single particle size, in which the particle size distribution is essentially zero.

SUMMARY OF THE INVENTION

In accordance with the invention, the preparation of an amorphous gel of a hydrated oxide is coupled with the technique of controlled seeding to obtain monosize crystallized particles. Crystalline oxide particles are formed by a method comprising:

(a) providing precursor components to an oxide;

(b) forming an amorphous phase of the oxide by
 (1) dissolving precursor components in a solvent, and
 (2) coprecipitating to form an amorphous gel of a hydrated multicomponent oxide;

(c) forming nuclei in the amorphous phase of the oxide by incubating the amorphous phase at an incubating temperature below that at which spontaneous nucleation occurs and above that at which the nuclei form; and (d) converting the amorphous phase to the crystalline oxide particles by
 (1) mixing the amorphous phase with a flux in which the amorphous phase is soluble at an elevated temperature and in which the nuclei are substantially insoluble at the elevated temperature to form a mixture,
 (2) heating the mixture to a crystal growth temperature not exceeding that temperature at which nucleation occurs to form the crystalline oxide particles, and
 (3) separating the crystalline oxide particles from the flux.

The oxide particles have a substantially single size, with a narrow size distribution. In particular, the particle size is in the range of about 0.1 to 4 µm, with a particle size distribution of about ±20%, which, for the purposes of the present invention, is considered to be essentially zero.

BRIEF DESCRIPTION OF THE DRAWINGS

(FIG. 6A), 800° C./800° C. (FIG. 6B), and 950° C./800° C. (FIG. 6C).

DESCRIPTION OF THE PREFERRED EMBODIMENTS

The method of the invention is suitably employed to produce oxides having substantially monosize, as defined above. The oxides beneficially produced in accordance with the invention include multi-component oxides, such as zircon, garnets, e.g., yttrium aluminum garnet and yttrium iron garnet, silicates, niobates, e.g., lithium niobate and potassium niobate, titanates, e.g., barium titanate, and tantalates.

Three steps are essential to obtain a monosize crystalline powder of a multi-component system in accordance with the teachings of the invention:

Step 1. Preparation of the Amorphous Oxide Material.

One of two methods may be employed to minimize the disparity in the solubility of the hydroxide of each precursor component. The disparity must be minimized to precipitate the hydroxides close to the starting composition, which, of course, is matched to the desired stoichiometry of the end product.

The two methods depend on the solvent used: aqueous or non-aqueous. The aqueous case presents a richer selection of precursor oxyanions that can be decomposed (pyrolyzed) to yield the mixed (not necessarily reacted) oxide, e.g., co-precipitation as hydroxide, carbonate, sulfate, oxalate, etc. Disparity in hydroxide precipitation through solubility may be reduced by use of a buffer, such as acetate.

The non-aqueous case does not offer such a selection; hydroxide precipitation in a quantitative manner can be carried out in a non-polar solvent. Thus, the hydroxide solubility-disparity consideration present in the aqueous case is not a critical factor in the non-aqueous case.

Thus, the choice of solvent, as the precipitation medium, is critical. The solvent may range from the usual one, water, to an organic solvent of lower polarity, such as (in decreasing polarity) alcohol, ether, ketone, and aliphatic hydrocarbon (e.g., hexane) and aromatic hydrocarbon (e.g., benzene).

As an example, the multi-component perovskite potassium niobate, $KNbO_3$, is derived from a precursor component ratio $1:1=KOH:Nb(OH)_5$ molar ratio (i.e., $KOH+Nb(OH)_5 \rightarrow KNbO_3+3H_2O$). Because of the tremendous disparity in solubility of the hydroxides in water (KOH being much more soluble), that solvent was an ineffective vehicle. The disparity was reduced in alcohol, specifically, ethanol, the alternate solvent. A molar ratio of 10:1 was used to compensate for the higher solubility of KOH. Still, the stoichiometric (1:1) product was not obtained reproducibly upon calcination. The quantitative (1:1) precipitation of the hydroxide could be effected in hexane, where both hydroxides are insoluble.

Step. 2. Controlled Nucleation.

This step is the second critical phase of the preparation method of the invention. One must establish the upper limit to the choice of thermal treatment for controlled nuclei (seed) production. The upper limit, the onset of grain growth, is not too far above the thermal point where spontaneous nucleation occurs. Past this upper limit averts control of size distribution and peak particle size. Below this upper limit lies a thermal range for incubation to generate seeds for extended crystallization in the step to follow.

The thermal region approximating the upper limit is determined by differential thermal analysis (DTA). In the case of an amorphous, intimate mixture of yttrium and aluminum hydroxides (3:5 molar ratio to form yttrium aluminum garnet, or YAG), the DTA thermogram showed a very sharp exotherm at 900° C.; X-ray diffraction showed the YAG crystal structure was defined. The following discussion illustrates how the thermal range for incubation was chosen. Incubation below spontaneous crystallization of the amorphous material lowered the free-energy state by extremely localized crystallization with no grain growth, ranging from a structure that still looked amorphous (700° C. incubation, FIG. 1) to one which started to show vestiges of the YAG structure (800° C. incubation, FIG. 2). At and beyond the spontaneous-crystallization point (cf. FIG. 3), localized crystallization was completed. In the present example of YAG, completion of crystallization was thermally differentiated from the occurrence of grain growth, as suggested by the extremely sharp exotherm seen in the DTA thermogram.

The seed density increases very rapidly as the temperature selected approaches the upper limit, which is the temperature for the occurrence of spontaneous nucleation. Without subscribing to any particular theory, the amorphous phase, prior to incubation, is viewed as a jumbled network of metal to oxide links where the distances were larger than the equilibrium distance of the stable (YAG) phase. Incubation allowed the network to "close ranks", a process that was downhill in energy. When the flux (solvent, STEP 3 below) was applied, those regions where the metal to oxide distances were larger than the YAG distance became the nutrient, and those that were close to the equilibrium distance became the seeds. In this working model of digestion, the concept of seed density is ill-defined.

The lower limit of the incubation temperature is the lowest temperature that generates seeds. Typically, this temperature is within about 400° C. below the crystallization temperature. Since most oxides have crystallization temperatures approaching 1000° C. and higher, it will be appreciated that the incubation temperature is several hundred degrees C., depending on the specific oxide being formed.

Step 3. Conversion of the Amorphous Material to Monosize Crystal Powder.

A second solvent, called the flux, for crystallization, must now be chosen. The solvent should have a melting point well below the spontaneous-crystallization temperature of the amorphous phase in question. It should also have a wide liquid range, with the boiling point occurring considerably higher than the spontaneous-crystallization point of the amorphous phase in question. A solubility on the order of 0.1%, which is easily realized, is preferred for digestion. A much higher solubility, coupled with a non-judicious choice of flux:nutrient ratio, runs the risk of effecting complete dissolution. In the subsequent cooldown, spontaneous nucleation and crystallization take over, removing control of the peak size and the size distribution. It should be noted that the two modes of spontaneous crystallization, STEPS 2 and 3, must be avoided for control of peak size and size distribution of the end product.

An example of a suitable flux employed with YAG in the method of the invention comprises NaCl and NaF. The eutectic point of this system is 674° C. at 34% NaF.

The function of the solvent, or flux, is to dissolve the amorphous fraction to provide the nutrient for the growth of the nuclei that were formed in the preceding step (Step 2). This is possible because the amorphous form, that is, the state with the higher free energy, has a higher solubility than the crystallized state. The solvent should not be operated beyond the thermal range chosen for incubation in the preceding step. Also, the solvent chosen should be easy to separate from the crystallized material.

PROCESS CONSIDERATIONS.

The present invention is based on two process steps. Taken in sequence, they are (1) the preparation of a stoichiometric product in the amorphous form, and (2) size-controlled crystallization through judicious use of the appropriate flux. As will be appreciated by those skilled in this art, the crucial part of the sequence is (2), which is now taken up first.

The function of a flux (or mineralizer) is to lower the reaction temperature between the component oxides. That comes about due to the low solubility of the components providing the transport mechanism for the reaction from thermodynamics. If the stoichiometric product has a higher solubility than the product of the respective solubilities of the components, the reaction (i.e., formation of the product) will proceed forward in the fluxed (dissolved) state. That means, in the fluxed state, the latter has a lower free-energy than the sum of free energies of the reacting components.

The amorphous product has a higher solubility than the crystallized form, a thermodynamic fact. This solubility difference providing the drive to a size-controlled crystallization is the basis of the present invention. Since amorphous product-oxides can be made by established procedures, e.g., co-precipitation, aerosol pyrolysis, sol-gel, etc., the making of the amorphous form is not, per se, critical to the practice of the process disclosed and claimed herein.

Thus, the issue is what fluxes allow the reaction of component oxides in the fluxed state, to produce the crystallized oxide. In particular, the metal halides, for example, fluoride and chloride, or the metal nitrates may be employed in the practice of the present invention. Specifically, the metal cation is selected from the group consisting of the alkalis, for example, sodium and potassium, the alkaline earths, and lead. Further, mixtures of metal halides or of metal nitrates may be employed.

The halide(s) or nitrate(s) are chosen to form a eutectic or near-eutectic mixture with the oxide to be formed. The term "near-eutectic" is used to describe that temperature on either side of the eutectic temperature defined by a compositional variation in the mixture of the oxide and flux of about 10%. A eutectic or near-eutectic mixture is chosen to increase the temperature range, which avoids any separation of a flux phase during cooling. The determination of suitable combinations of halide (or nitrate) and oxide to form such eutectic and near-eutectic mixtures is not considered to constitute undue experimentation, when taken in light of the teachings herein.

Examples of suitable combinations of oxide and flux are as follows:

| Oxide | Flux |
|---|---|
| barium sulfate | NaCl; KCl |
| aluminum oxide (corundum) | NaCl; KCl |
| perovskites | $KNO_3$; $NaNO_3$ |
| garnets | NaCl; KCl |
| terbium-doped yttrium aluminum garnet | NaCl + NaF |

EXAMPLES

Example 1:

The preparation of a green phosphor, comprising the garnet host $Y_3Ga_2Al_3O_{12}$ doped with 5 mole % terbium, is described below. Here, four components whose hydroxides are quite insoluble in water are involved. Hence, water suffices as the solvent for the first step.

In STEP 1, the sesquioxides $Y_2O_3$ (3.218 g), $Ga_2O_3$ (1.874 g), and $Tb_2O_3$ (0.274 g) and aluminum metal (0.809 g) were dissolved in nitric acid solution (3 to 6N). They were simultaneously coprecipitated by introducing the solution gradually into an excess of strong $NH_4OH$ solution (8 to 12N) with vigorous stirring. The resulting supernatant liquor was decanted off. The precipitate was washed several times with water by decantation to remove $NH_4NO_3$. The residual water in the last washing step was removed by several washings (also by decantation) with methanol. With $CH_3OH$ replacing water, the material was easily dried in an oven at 90° C.

In STEP 2, a sample of the material was subjected to differential thermal analysis (DTA). The resulting thermogram showed a sharp exotherm at 900° C., signalling spontaneous conversion to the garnet structure. At this point, the cooled material was verified by powder X-ray diffractometry to possess the garnet structure. To generate the seeds to nucleate controlled-size crystal growth, the material was slowly heated from room temperature to an incubating temperature within the range of ≧700° C. to ≦950° C. The choice of incubating temperature in this range depends on how many seeds need to be nucleated. The incubating temperature is easily determined experimentally, since if the number of seeds is too few to be detected by X-ray diffraction, nucleation of seeds may be found empirically by subsequent flux growth.

Figure 1:
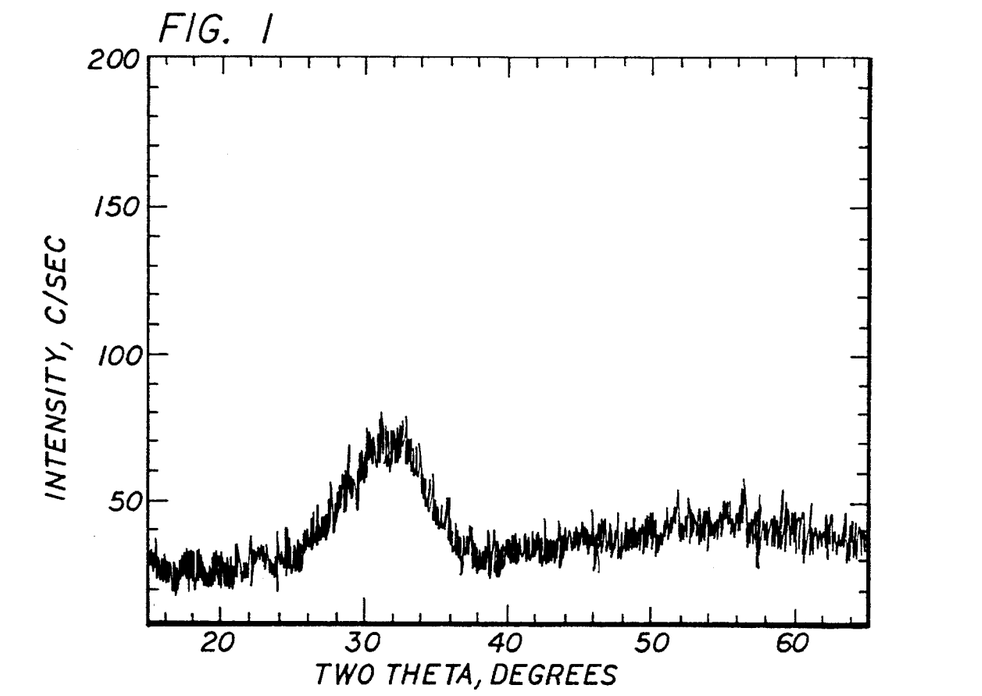
FIG. 1, on coordinates of intensity (counts per second) and 2θ angle (degrees), is a diffractometer plot of amorphous yttrium aluminum garnet, doped with terbium, as a result of slow incubation from room temperature to 700° C.
Figure 2:
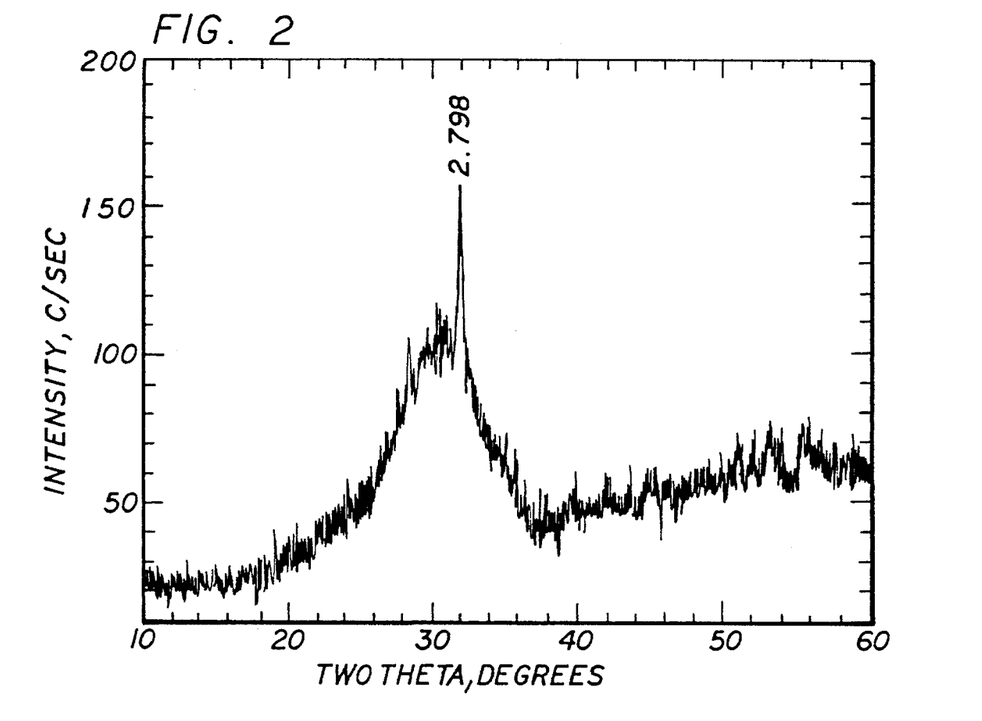
FIG. 2 is a plot similar to that of FIG. 1, but after a two hour incubation of the material at 800° C. to produce seeds, as evidenced by the peak at the 2θ value of 32°.
Figure 3:
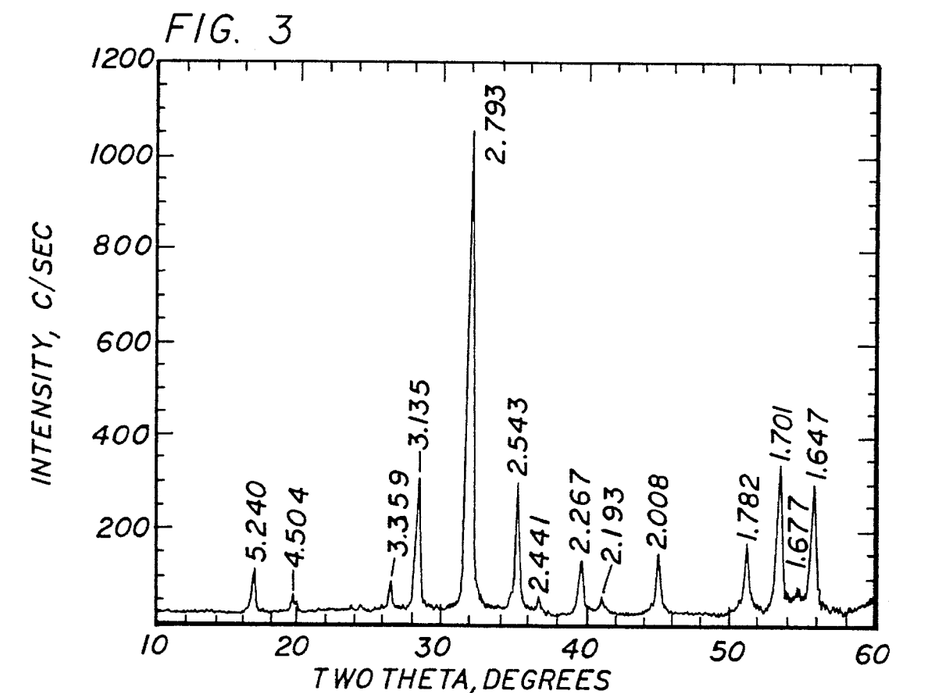
FIG. 3 is a plot similar to that of FIG. 2, but after a two hour incubation of the material at 950° C. to fully and spontaneously crystallize the amorphous material and form the garnet structure.

The following X-ray diffractograms point up the significance of the choice of the thermal range given in the preceding paragraph. In FIG. 1, the material was heated slowly from room temperature to 700° C., in the span of 4 hours, and the power turned off. The material is seen to be amorphous. FIG. 2 shows that following a 2-hour incubation at 800° C. seeds are produced, as evidenced by the strong line at the two-theta (2θ) value of 32°. FIG. 3 shows that after a 2-hour incubation period at 950° C., the amorphous material is fully and spontaneously crystallized (garnet structure). The spacings identified (Å) indicate garnet lines.

In STEP 3, a crystallization solvent is employed, matching the requirements set forth above. In this particular example, the choice of crystallization solvent (flux) was NaCl:NaF=2:1 molar ratio, which is close to the eutectic composition, which involves a melting temperature below the lowest incubation temperature chosen (here, 700° C.). Other combinations may be derived from halides, oxides, nitrates, etc. Aside from the constraint on the eutectic point and the liquid range, the metal-species of the flux used must not react with the component oxides of the nutrient or substitutionally incorporate in the end product.

The amorphous material was mixed with the flux in a platinum container at a 1:2 weight ratio. The mixture was slowly heated to the same temperature adapted for seed generation and soaked isothermally for 3 days. The cooled material-flux mix was broken up and leached in water to recover the crystallized powder.

Figure 4:
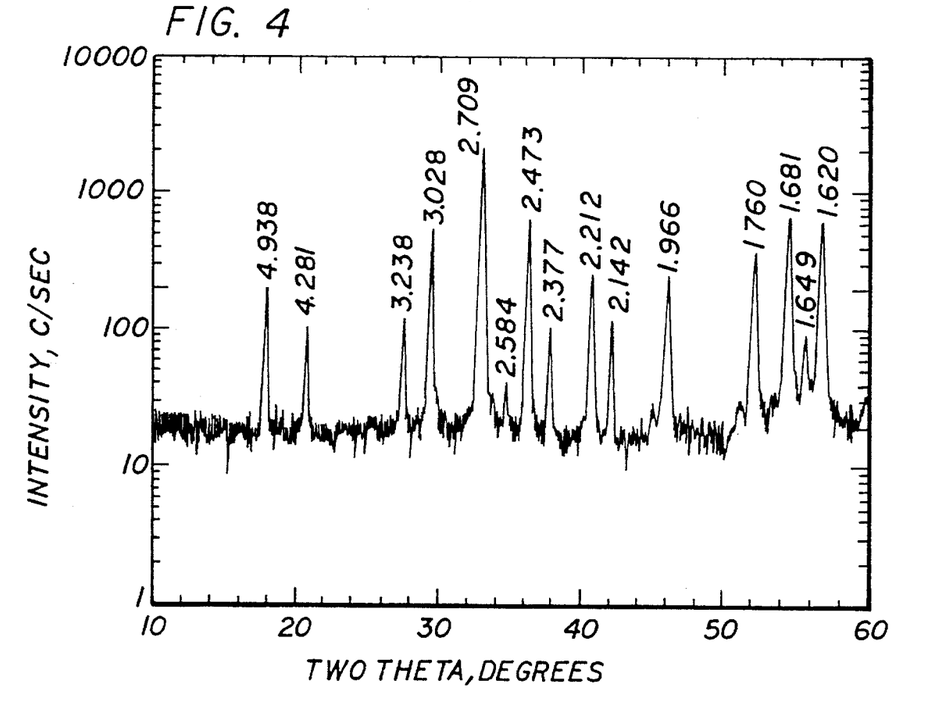
FIG. 4 is a plot similar to that of FIG. 1, but in this instance, the amorphous material, after the incubation, was then soaked in a flux for three days at 700° C. to form the crystalline garnet structure.
Figure 5:
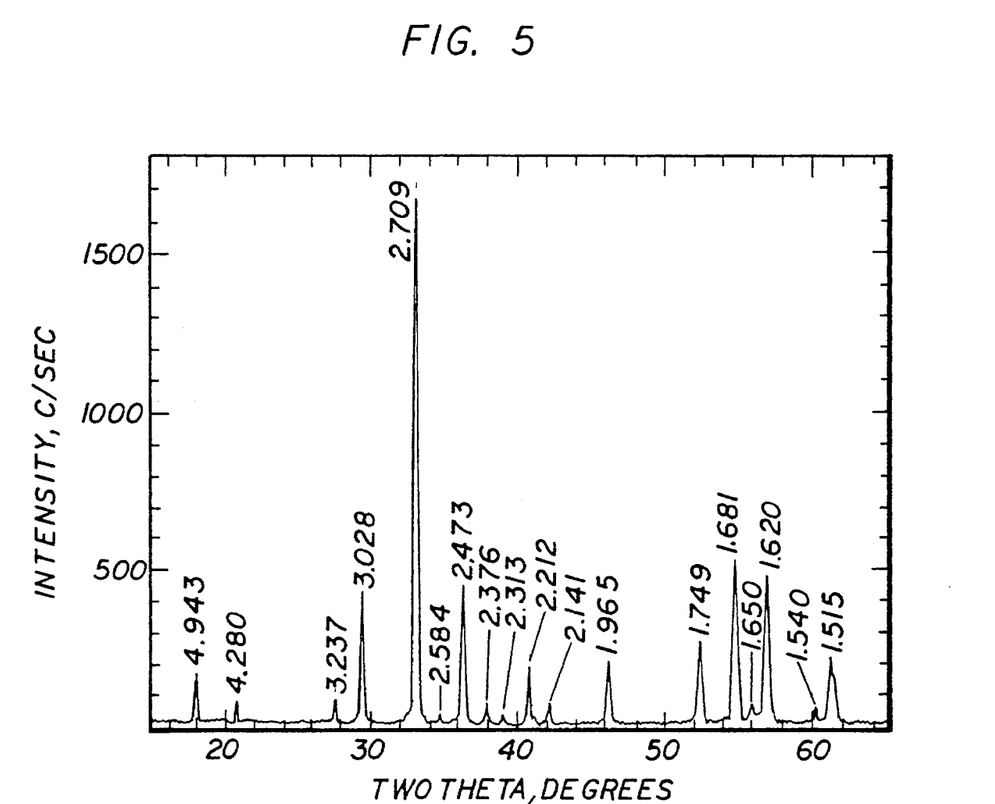
FIG. 5 is a plot similar to that of FIG. 2, but in this instance, the seeded material, after the incubation, was then soaked in a flux for 3 days at 800° C. to form the crystalline garnet structure.

X-ray powder diffraction was employed to assess and compare the results of thermal treatment, the fluxed versus the unfluxed cases. The merit to the use of the flux is depicted in FIG. 4. After a 3-day soak at 700° C., flux plus amorphous material, the garnet structure is well-developed. This is to be compared with FIG. 1, in which the material remains amorphous after the heating to 700° C. without the benefit of the flux. FIG. 5, the fluxed case, is to be compared with FIG. 2, the unfluxed case, where the soak is carried out at 800° C. The garnet structure is as fully developed in FIG. 5, fluxed case at 800° C., as in FIG. 3, the unfluxed case at 950° C. In the latter case, crystallization is spontaneous, but, as will be shown below, does not entail complete loss of control on particle size and its distribution.

The result with YAG showed that the energy barrier to grain growth was significantly higher than that of spontaneous crystallization. The thermal differentiation for activation of the two processes (crystallization and grain growth) permitted obtaining a fine size distribution. Such thermal differentiation may not be as pronounced for other multi-component oxides. In such a case, the DTA exotherm would not be sharp.

Figure 6A:
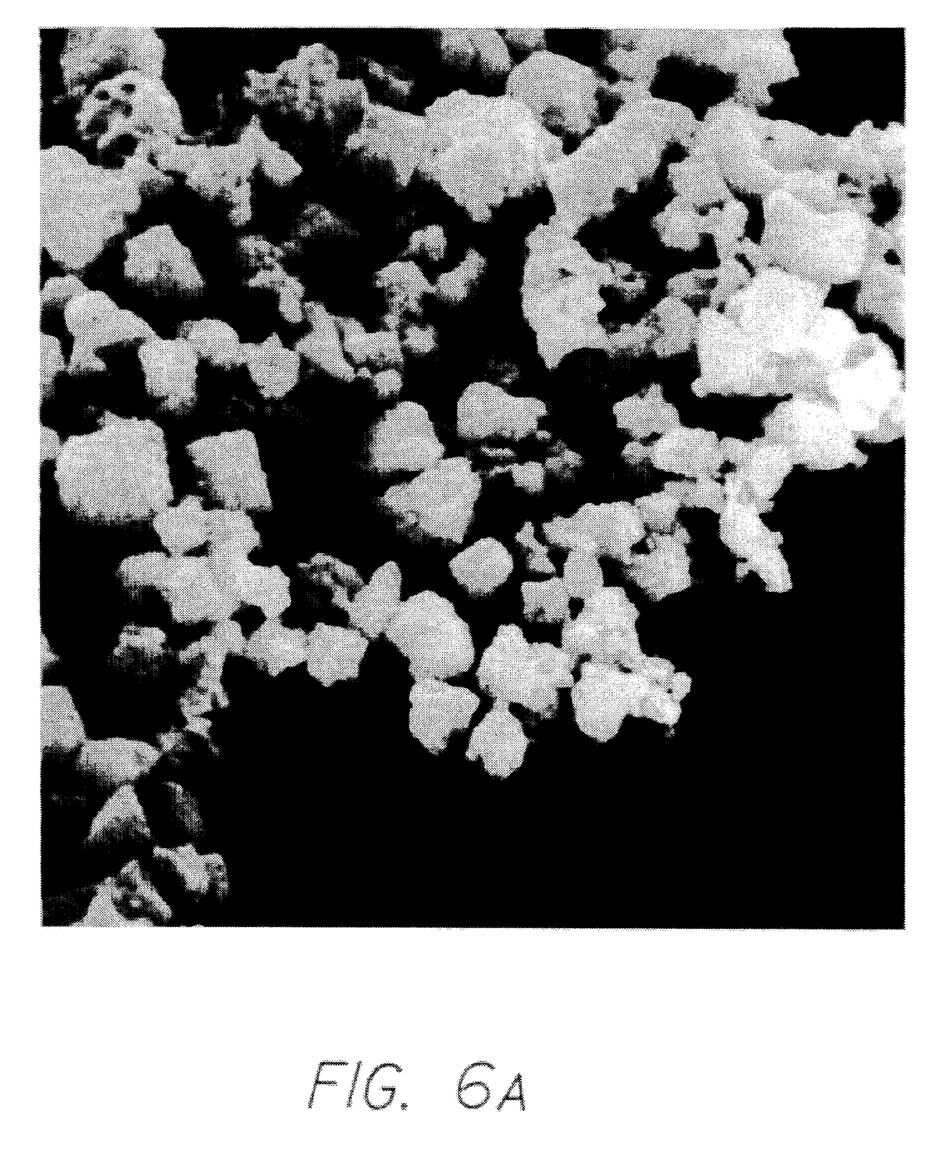
FIGS. 6A–C are scanning electron microscope photographs at incubation/flux temperatures of 750° C./750° C.
Figure 6B:
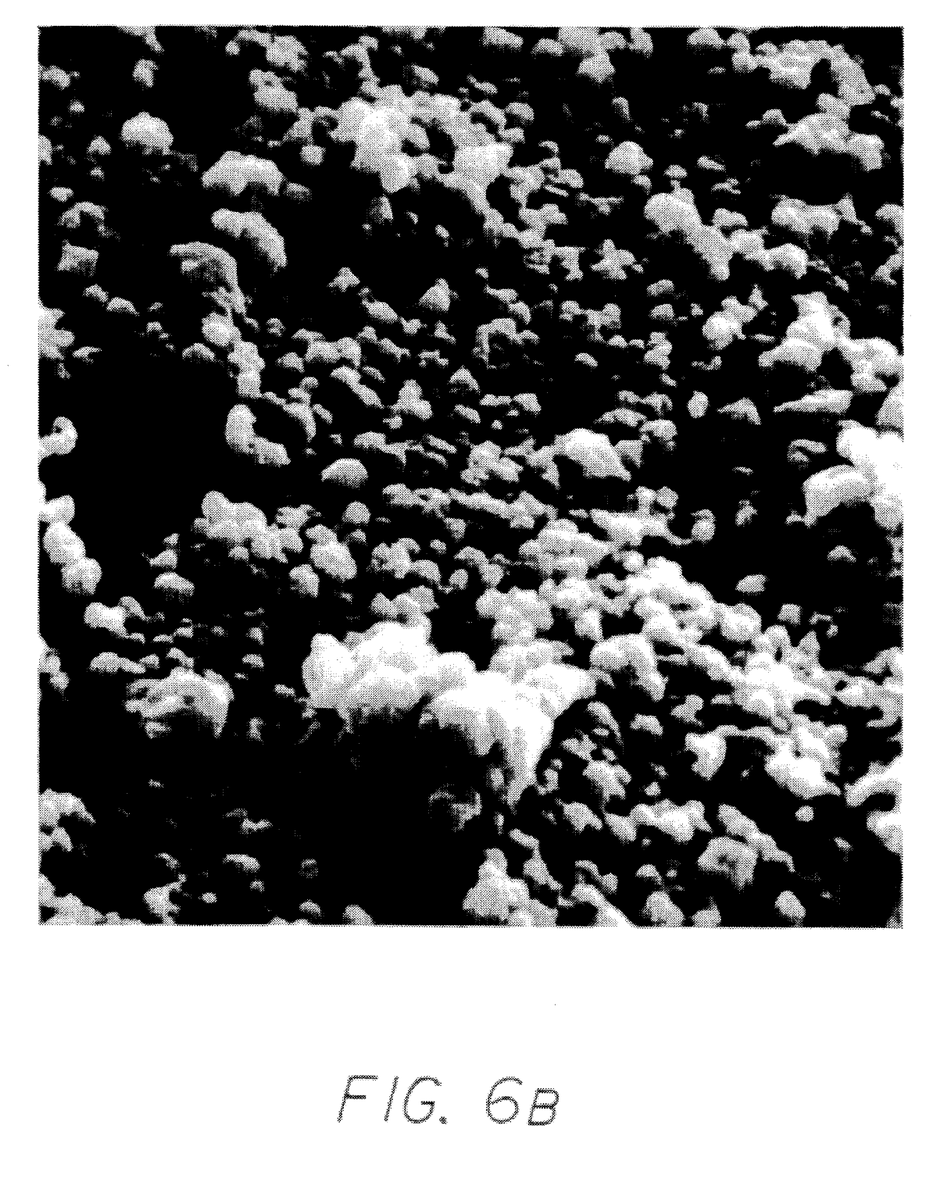
Figure 6C:
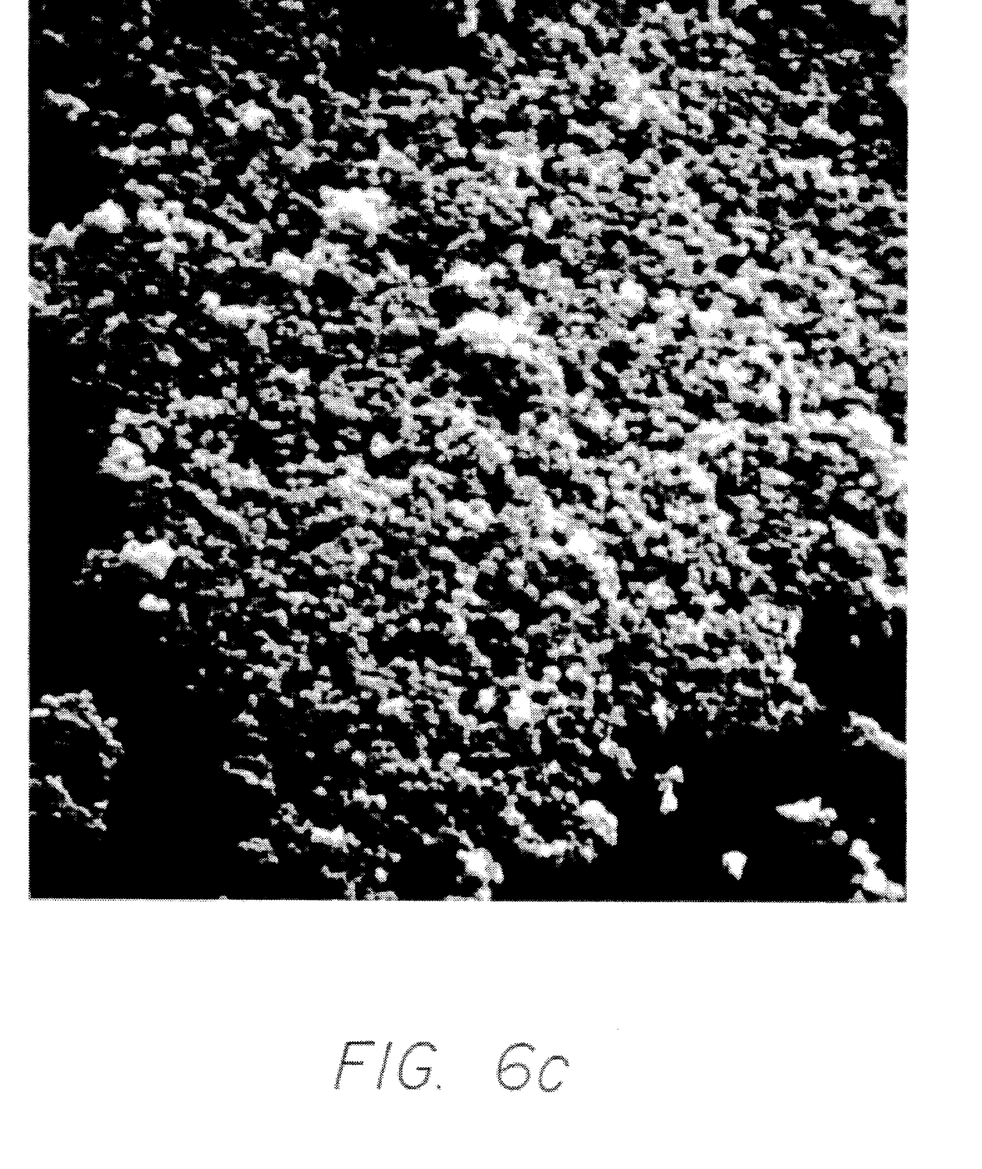

It will be appreciated that a low incubation temperature means a smaller number of nuclei and, therefore, a larger fraction of amorphous material, the nutrient. Hence, the crystal size will be large. The preceding paragraph already hints at the sensitivity of the particle size control with choice of incubating temperature. To assess the effect of that choice, three batches of the amorphous powder were incubated/fluxed at 750°/750° (FIG. 6A), 800°/800°. (FIG. 6B), and 950°/800° (FIG. 6C). FIG. 6C utilized an incubation temperature (950° C.) which causes the amorphous form to spontaneously crystallize, according to FIG. 3. The scanning electron microscope (SEM) photographs of FIG. 6 show that the lower the incubation temperature, the larger the crystal size—ranging from 2 to 4 µm of FIG. 6A to ≈1 µm of FIG. 6B to ≈0.5 µm of FIG. 6C. Despite incubation at 950° C., past the point of spontaneous crystallization (900° C.), the fluxed material at 800° C. (FIG. 6C) shows particle growth has not occurred.

Size distribution was not measured in each case. The SEM photographs gave a rough idea that the distribution, in each case, was fairly sharp. The use of the term "monosize" is relative. For example, in FIG. 6A, the peak size is about 3 µm, with a full-width at half height of less than 2 µm, a distribution which has been obtained free of any subsequent mechanical processing. With commercial sources, the same peak size and width for YAG would have incurred comminution and/or sizing of a much larger peak and broader distribution. But then, the particles would be either badly damaged or obtained by a very low yield process.

The following examples show combinations of the preparation of a specific oxide in a flux, to demonstrate the viability of the combination.

Example 2:

The preparation of barium sulfate of high purity for ceramic reflectors was performed as follows:

Reactants: 20.8 g barium chloride and 17.4 g potassium sulfate.

Flux: 61.8 NaCl

Process: The three powders were mixed together and then transferred to a porcelain crucible. The crucible was placed in a furnace, and the temperature was ramped up to 800° C. The crucible was soaked at that temperature for 2 hours, and then cooled down. The flux was removed by repeated washings with hot water. The dried product weighed about 23 g.

Alternates: For barium chloride, one may substitute anhydrous barium hydroxide. For NaCl flux, one may substitute the equivalent KCl (78.8 g) and reduce the soak temperature to 780° C.

Example 3:

The preparation of aluminum oxide (corundum), commonly employed as a ceramics component, was performed as follows:

Reactants: 90.7 g ammonium aluminum sulfate dodecahydrate (alum).

Flux: 87.7 NaCl.

Process: The alum was dehydrated overnight at 60° C. The alum was then ramped to 400° C. and soaked for 4 hours. The alum was then cooled, mixed with flux, and introduced into a platinum crucible. The crucible was placed in a furnace and ramped to 800° to 850° C. The crucible was soaked at that temperature for 10 hours. After cooling, the flux was extracted by repeated washings with hot water. The dried product was about 10 g of alumina (corundum).

Example 4:

The preparation of perovskites of the formula $KMO_3$, where $M=Ta_{1-x}Nb_x$, where $0 \leq x \leq 1$, is now described, with reference to the compound potassium tantalum niobate (KTN), where $x=0.3$.

Reactants: 5.7 g potassium hydroxide, 15.5 g tantalum pentoxide, and 4.0 g niobium pentoxide.

Flux: 100 g potassium nitrate.

Process: Potassium nitrate was melted (mp=334° C.) in a 400 ml pyrex beaker. At a temperature of about 340° to 350° C., the pentoxide powders were introduced to the melt under continuous stirring. Potassium hydroxide was very gradually added and the combination allowed to soak for 2 to 3 hours. The melt and suspended product was quenched by pouring onto a stainless steel sheet. The quenched pieces were reintroduced back into the beaker and extracted repeatedly with hot water. The washings were discarded. The dried powder comprised about 24 g of KTN.

Alternates: The potassium carbonate equivalent of potassium hydroxide may be used as an alternate. Sodium nitrate may be used as flux totally or partially replacing potassium nitrate. The reaction temperature may be lowered to about 320°.

Example 5:

The preparation of rare earth garnets of the formula $R_3Al_5O_{12}$, where R is a rare earth, including yttrium, selected from the group consisting of Er, Ho, Y, or Dy, is now described with reference to the compound where R=Er.

Reactants: 57.4 g erbium sesquioxide and 25.5 g aluminum oxide.

Flux: 100 g NaCl.

Process: the reactants and flux powders were mixed well and introduced into a crucible. The crucible was placed in a furnace and the temperature was ramped up to 800° to 850° C. The crucible was soaked for 15 to 20 hours. The crucible was cooled and the crucible and its contents were transferred into a beaker. The product was extracted repeatedly with hot water and the washings discarded. About 83 g of erbium aluminum garnet was obtained.

Alternate: The equivalent in potassium chloride may be partially or totally substituted for sodium chloride.

Examples 2–5 given above made use of a flux which effected the reaction at a temperature lower than required by the prior art high temperature reaction between physically-mixed oxides. Thus, the solubility relation given above was satisfied by the chosen examples. It also follows that the respective fluxes may be employed to carry out size-controlled crystallization from the amorphous state of the product.

From the foregoing discussion, it is evident that one constraint in the choice of flux is that its melting point (mp) must be lower than the temperature for spontaneous crystallization (sp, as established by DTA) of the amorphous state which itself is lower than the temperature required to initiate the prior art solid state reaction of oxides. Aside from the requirement that sp>mp, the larger the difference between sp–mp, the wider the leeway to control the target peak-size of the distribution.

Volatilization of the flux material must be low. Otherwise, crystallization by precipitation through loss of solvent may become runaway. That condition leads to an uncontrolled component of crystallization riding over the size-controlled process. Hence, a high boiling point (bp) flux is preferred. This means a large liquid range (LR) through the definition LR=bp−mp.

Thus, there has been disclosed a method for forming crystalline phosphor particles of substantially a single size, with a narrow size distribution. It will be apparent to those skilled in this art that various changes and modifications of an obvious nature may be made without departing from the spirit of the invention, and all such changes and modifications are considered to fall within the scope of the invention, as defined by the appended claims.

What is claimed is:

1. A method of forming crystalline oxide particles having a narrow size distribution, comprising:
    (a) providing precursor components to an oxide;
    (b) forming an amorphous phase of said oxide by
        (1) dissolving said precursor components in a solvent, and
        (2) coprecipitating said precursor components to form an amorphous gel of a hydrated multicomponent oxide;
    (c) forming seeds in said amorphous phase of said oxide by incubating said amorphous phase at an incubating temperature below that at which spontaneous crystallization occurs and above that at which said seeds form; and
    (d) converting said amorphous phase to said crystalline oxide particles by
        (1) mixing said amorphous phase with a flux in which said amorphous phase is soluble at an elevated temperature and in which said seeds are substantially insoluble at said elevated temperature to form a mixture,
        (2) heating said mixture to a crystal growth temperature not exceeding said incubating temperature to grow said seeds, thereby forming said crystalline oxide particles, and
        (3) separating said crystalline oxide particles from said flux.

2. The method of claim 1 wherein said oxide particles have a particle size within the range of about 0.1 to 4 μm.

3. The method of claim 1 wherein said oxide is selected from the group consisting of, silicates, niobates, titanates, and tantalates.

4. The method of claim 3 wherein said oxide is selected from the group consisting of yttrium aluminum garnet, yttrium iron garnet, potassium niobate, lithium niobate, and barium titanate.

5. The method of claim 1 wherein said non-oxide components are dissolved in substantially stoichiometric proportions relative to each other in said solvent.

6. The method of claim 1 wherein said mixture of step (d) (2) is heated to substantially the same temperature as said incubating temperature.

7. The method of claim 3 wherein said silicates are selected from the group consisting of garnets and zircon.

8. The method of claim 1 wherein said flux is selected from the group consisting of halides of alkalis, alkaline earths, and lead and mixtures thereof and of nitrates of alkalis, alkaline earths, and lead and mixtures thereof.

9. The method of claim 8 wherein said flux is selected from the group consisting of sodium fluoride, sodium chloride, potassium chloride, sodium nitrate, and potassium nitrate.

10. A method of forming crystalline terbium-doped yttrium aluminum garnet particles having a narrow size distribution, comprising:
    (a) forming an amorphous phase of a garnet composition by
        (1) dissolving precursor components to said terbium-doped yttrium aluminum garnet composition in a solvent, and
        (2) coprecipitating said precursor components to form an amorphous gel of a hydrated garnet composition;
    (b) forming seeds in said amorphous phase of said gel by incubating said amorphous phase at an incubating temperature below that at which spontaneous crystallization occurs and above that at which said seeds form; and
    (c) converting said amorphous phase to said crystalline garnet particles by
        (1) mixing said amorphous phase with a flux in which said amorphous phase is soluble at an elevated temperature and in which said seeds are substantially insoluble at said elevated temperature to form a mixture,
        (2) heating said mixture to a crystal growth temperature not exceeding said incubating temperature to grow said seeds, thereby forming said crystalline garnet, and
        (3) separating said crystalline garnet from said flux.

11. The method of claim 10 wherein the amorphous phase is formed by
    (a) dissolving the sesquioxides $Y_2O_3$, $Ga_2O_3$, and $Tb_2O_3$ and aluminum metal in nitric acid to form a solution;
    (b) coprecipitating an amorphous gel of hydrated garnet stoichiometry by adding an excess of ammonium hydroxide to said solution;
    (c) separating said amorphous gel from the resulting supernatant liquor;
    (d) washing said amorphous gel to remove ammonium nitrate; and
    (e) drying said amorphous gel.

12. The method of claim 10 wherein said nuclei are formed by heating said amorphous gel to said incubating temperature, said incubating temperature being between about 700° C. and 900° C.

13. The method of claim 10 wherein said amorphous phase is converted to said crystalline garnet particles by
    (a) mixing said amorphous gel in a flux comprising NaCl:NaF in a molar ratio of about 2:1, the weight ratio of gel to flux being about 1:2, to form a mixture;
    (b) heating said mixture to a nucleating temperature not exceeding that temperature at which spontaneous nucleation occurs for a period of time; and
    (c) recovering said crystalline garnet particles from said mixture.

14. The method of claim 13 wherein said mixture is heated at said incubating temperature, said incubating temperature being about 700° C. to 900° C.

15. The method of claim 10 wherein said flux is selected from the group consisting of halides of alkalis, alkaline earths, and lead and mixtures thereof and of nitrates of alkalis, alkaline earths, and lead and mixtures thereof.

16. The method of claim 15 wherein said flux is selected from the group consisting of sodium fluoride, sodium chloride, potassium chloride, sodium nitrate, and potassium nitrate.

* * * * *